Feb. 6, 1934.   J. T. EARLE ET AL   1,945,969
DETACHABLE RACK FOR TRUCKS
Filed May 3, 1930
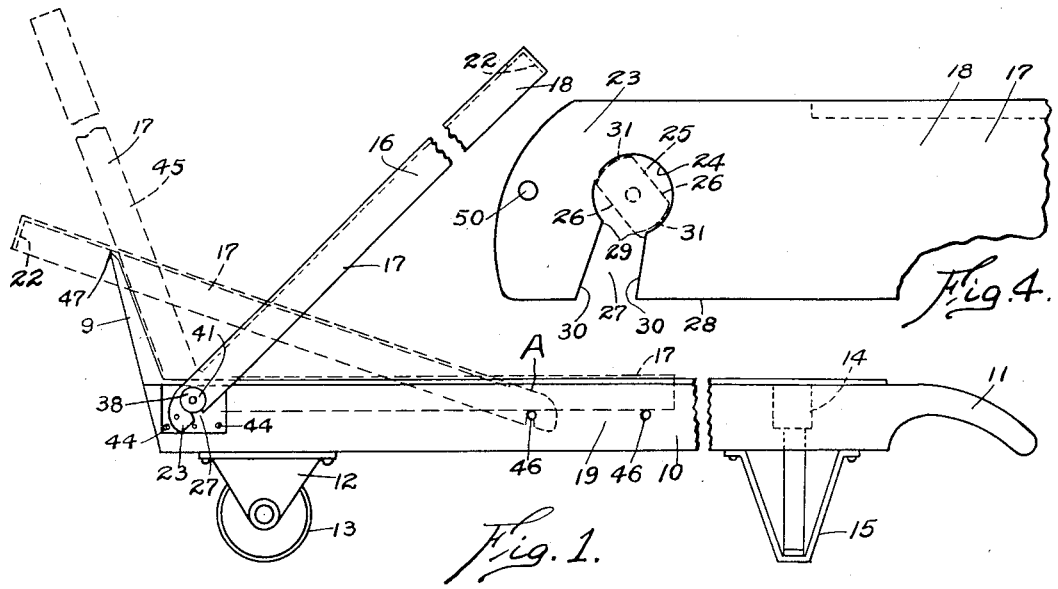
Fig. 4.
Fig. 1.
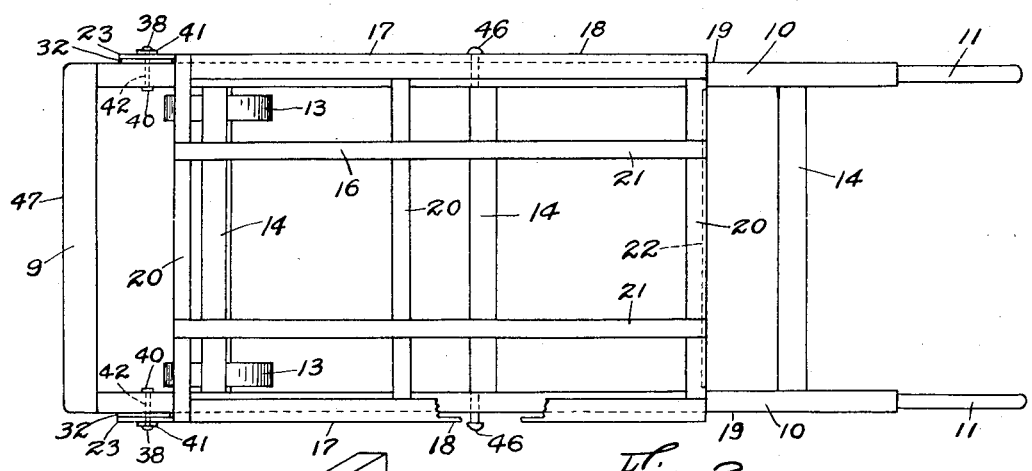
Fig. 2.
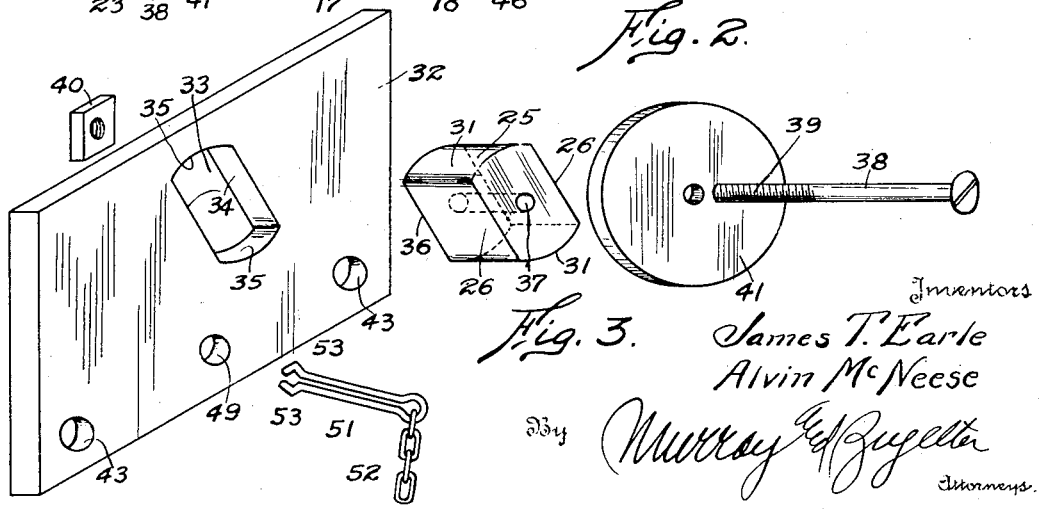
Fig. 3.
Inventors
James T. Earle
Alvin McNeese Patented Feb. 6, 1934

1,945,969

UNITED STATES PATENT OFFICE 1,945,969

DETACHABLE RACK FOR TRUCKS

James T. Earle, Cincinnati, Ohio, and Alvin McNeese, Covington, Ky.

Application May 3, 1930. Serial No. 449,540

6 Claims. (Cl. 280—57)

This invention relates to improvements in a detachable rack for trucks or carriages such as are used in the handling of freight or merchandise.

An object of the invention is to provide a truck with an improved rack or frame which may be disposed in operative and inoperative positions with respect to the truck, or removed bodily from the truck, if desired.

Another object is to provide a novel rack or frame mounting for a truck or carriage, whereby the rack or frame is precluded from accidental displacement from its position on the truck.

Another object of the invention is to provide a rack and mounting means therefor which may be applied to various types of trucks and sleds, as disclosed in our co-pending application bearing Serial Number 441,840.

Another object is to provide a rack for the purpose stated, which may readily be applied to a truck in various positions for the accommodation of articles of various dimensions.

Another object is to provide a simplified form of detachable rack and mounting therefor.

These and other objects are attained by the means described herein and disclosed in the accompanying drawing, in which:

Fig. 1 is a side elevational view of a truck or carriage embodying the invention, the rack therefor being shown in various positions.

Fig. 2 is a top plan view of the device shown in Fig. 1, showing the rack or frame in the inoperative or lowered position.

Fig. 3 is an enlarged exploded perspective view of the rack mounting means of the invention.

Fig. 4 is a side view, slightly reduced in size, of a rack leg for cooperation with the mounting means shown in Fig. 3.

In the trucking or carriage of freight or merchandise by means of hand trucks or the like, it is frequently desirable to provide a means other than the usual transverse blade or lifting piece 9 for precluding inadvertent displacement of the goods upon the truck. Various types of racks and auxiliary frames have been devised for holding stacked goods upon such trucks, but these racks were permanently attached to the trucks and not readily removable. The present invention treats of a rack which has all the advantages of a permanently attached pivoted rack, and in addition, it may readily be disassociated from the truck and placed thereon in different positions for facilitating the handling of large or bulky objects which overhang the truck. When the truck is to be used without a rack for extended periods of time, such rack may readily be removed, thereby eliminating the added weight of the rack. When needed, the rack may be applied to the truck with but little effort.

The hand truck shown in Figs. 1 and 2 is of ordinary construction, comprising a pair of spaced parallel rail members 10 having handles 11 formed at their rearward ends and having brackets 12 and wheels 13 disposed at their opposite or forward ends. Spacers for the rail members are indicated by 14, and 15 represents legs for the rear portion of the truck. The blade or lifter 9 is of any approved type and usually is inclined forwardly and upwardly at an obtuse angle to the rail members.

A rack 16 and pivotal mounting means therefor are disposed at the forward end of the truck adjacent the blade 9. The rack comprises a pair of parallel side members 17 preferably of angle iron, the vertical legs 18 of which are disposed adjacent to the outside faces 19 of the truck rail members. The side members 17 of the rack are connected and held in spaced relation by means of transverse straps 20, welded, riveted or otherwise secured to the members 17. Longitudinally disposed straps 21 are provided for connecting the transverse straps 14. The longitudinal straps 21 are spaced sufficiently from one another, and from the center-line of the rack to provide stops for precluding rolling of an object such as a barrel, from the truck during carriage.

The rearmost transverse strap 20 is of angle iron one leg 22 of which extends downwardly in the direction of legs 18, for a purpose to be explained hereinafter. The forward end 23 of each side member or leg 17 of the rack is provided with a circular opening 24 adapted to freely receive therein a rack pivot member 25 of generally cylindrical shape but having a pair of parallel flat faces 26 located on opposite sides thereof. The diameter of the opening 24 is slightly greater than that of the rack pivot member, and the mouth or slot 27 which extends from an edge 28 of the leg to the opening 24 is slightly wider than the distance between the faces 26 of the member 25. As shown in Fig. 4, the mouth 27 is slightly wider adjacent the edge 28 than in the region of opening 24. The constricted portion thereby formed is indicated by 29. From the foregoing it should be apparent that the rack pivot member may be passed through the slot or mouth only when the parallel faces 26 of the pivot member are disposed in parallelism with the substantially parallel walls 30 of the mouth. In any other position, the curved outer faces 31 of member 25 will bear upon the wall of opening 24, thereby precluding movement of member 25 through the slot or mouth. By slightly flaring the mouth 27 outwardly, as above described, the insertion of member 25 into the slot, in the direction of the opening 24, is greatly facilitated.

Means are provided for fixedly supporting a rack pivot member 25 upon each of the vertical outer faces 19 of the truck rails 10, in the region of the blade or lifting piece 9. Said means are identical for both rails of the truck, wherefore a description of one will suffice for the other also. The support means comprises the substantially flat plate 32 which has formed near the center thereof a perforation or opening 33 having a pair of flat opposed walls 34 corresponding to the walls 26 of member 25, and a pair of opposed curved walls 35 corresponding to the walls or bearing portions 31 of said member. The size of opening 33 is such that it will snugly receive one end 36 of the rack support member. Obviously, the rack support member is thereby precluded from rotation within the opening. The rack support member is provided with an axial bore 37 for reception of a screw or other fastening means 38 having threads 39 for engagement with a threaded nut 40. The screw is adapted to pass through a perforate washer 41, bore 37, opening 33, and a transverse bore 42 in the rail member 10. The nut serves to hold the parts in assembled relationship with the end 36 of member 25 in abutment upon rail 10. Washer 41 is large enough to limit movement of the leg 17 along the rack support member when in position thereon.

The plate 32 is provided with a plurality of perforations 43 cooperating with screws or bolts 44 for securing the plate permanently to a rail member 10. Any other means of securing the plate may be employed, however.

It will be noted that the major axis of opening 33 extends forwardly and upwardly relative to the plane of the truck body, wherefore the rack can be removed from the truck only upon inclining the rack to the position indicated by full lines 17 in Fig. 1. The angle of inclination is convenient for applying and removing the rack, and further, the rack will not become disassociated from the rack support member when the truck is rolled over obstructions and uneven surfaces, because the bearing faces 31 will be in abutment with the walls of opening 24, as indicated in Fig. 4. The same condition exists when the rack is disposed in the operative position indicated by 45 (Fig. 1), wherein the rack abuts the blade or lifting piece 9 for limiting forward movement thereof.

From the foregoing it will be apparent that the rack may not be disassociated from the truck unless it is first disposed in the inclined position indicated in Fig. 1. The distance between the ends 23 of legs 17 of the rack exceeds the width of the truck by an amount approximately equal to the combined thickness of the plates 32, wherefore the rack may readily be placed upon the truck with the ends straddling the truck intermediate the ends of the truck, as indicated at A, (Fig. 1). The rails of the truck may be provided with pairs of extending studs 46 for engaging the openings 24 of the rack legs, to preclude relative longitudinal movement of the rack and truck when the rack is placed thereon in reversed position A. The angle iron leg 22 is adapted to lie adjacent the top edge 47 of blade 9 for precluding displacement of the rack when used on a truck not provided with the studs 46. In the reversed positions, the rack affords protection to large bulky objects such as pieces of furniture, which would otherwise be damaged by the blade or lifter 9.

To adapt the device for use on trucks or sleds not provided with a blade 9, it is necessary to provide a means for holding the rack in a substantially vertical position. One means for the purpose is indicated in Figs. 3 and 4, which comprises perforations 49 and 50 in the plate 32 and leg 17, respectively, which perforations are adapted to register upon predetermined movement of the rack to the raised or operative position. Upon registration of the perforations, a pin or the like 51 may be inserted therein to preclude movement of the rack about its pivotal mounting. The pin or bolt 51 may be attached to a chain or the like 52, which in turn may be secured to the truck to preclude loss of the pin or bolt. Other forms of pins may be employed for the purpose, but a pin having means such as resilient ends 53 for precluding accidental removal from the perforations, is preferable. The invention is not to be limited by the particular means described and illustrated herein, for holding the rack in an upright or operative position. It will be apparent also that the rack supporting member may have only one flat face 26, in which case the opening of plate 32 will be altered accordingly.

It is to be understood that the device of the invention may be associated with various types of trucks and carriers, including sleds, and that various modifications and changes in structural details may be made therein, within the scope of the appended claims, without departing from the spirit of the invention.

What is claimed is:

1. In combination a truck body comprising a rail, a rack having a leg provided with a circular opening and a communicating slot of less width than the circular opening, a bored substantially circular rack supporting member of diameter slightly less than that of the circular opening, a flattened portion on the rack supporting member serving to decrease the diameter of a portion of the rack supporting member to permit of entry thereof into the communicating slot and the circular opening, a plate having a perforation therein for receiving the rack supporting member and cooperating to preclude rotational movement of the rack supporting member, and means for securing the plate, rail and rack supporting member against relative movement.

2. In combination with a truck body having an extending blade thereon, a rack removably mounted upon the truck body for movement to raised operative and lowered inoperative positions, extensions on the rack, the rack being adapted to be placed in a reversed but operative position atop the truck body in contacting relationship with the blade with the extensions thereof cooperating with the truck body to preclude lateral movement of the rack upon the truck body, and means operative upon disposition of the rack to each of said positions for connecting the rack to the truck.

3. In combination with a hand truck comprising a body tractionally supported at one of its ends, a removable reversible rack, an extension on the rack, means on the body cooperating with the extension to provide a pivotal mounting for the rack upon the body, and extending means on the body for cooperation with the rack extension upon reversal of the rack and disposition thereof atop the truck body, to preclude longitudinal movement of the rack relative to the truck body.

4. In combination with a hand truck body and an upwardly extending blade thereon having a face and a top edge, a removable rack arranged for pivotal movement upon the truck body and for abutting the face of the blade, and cooperative means on the rack and body for precluding longitudinal movement of the rack relative to the body when the rack is disposed atop the body in a reversed operative position in contact with the top edge of the blade.

5. In combination with a truck body a detachable rack mounted on the body for movement to operative and inoperative positions, the rack when in the inoperative position being substantially parallel to the body, and cooperative means fixed relative the body and the rack, respectively, for precluding detachment of the rack from the body when in said positions and permitting detachment in an intermediate position, and releasable means for positively securing the detachable rack upon the truck body in an upright position.

6. In combination with a hand truck body having wheels and an upwardly extending toe piece at its forward end, a pivot means adjacent the toe piece, abutments on the truck body located rearwardly of the pivot means, and a detachable reversible rack having common means at one of its ends for normal connection of the rack to the truck body at the pivot means, and at the abutments when the rack is positioned over the body and atop the toe piece.

JAMES T. EARLE.
ALVIN McNEESE.